UNITED STATES PATENT OFFICE.

CALEB G. COLLINS, OF NEW YORK, N. Y., ASSIGNOR TO CALVIN AMORY STEVENS, OF SAME PLACE.

PROCESS OF EXTRACTING COPPER AND ZINC FROM THEIR ORES.

SPECIFICATION forming part of Letters Patent No. 659,339, dated October 9, 1900.

Application filed October 30, 1899. Serial No. 735,290. (No specimens.)

*To all whom it may concern:*

Be it known that I, CALEB G. COLLINS, a citizen of the United States, residing at New York, (Woodmere,) in the county of Queens and State of New York, have invented certain new and useful Improvements in the Art of Extracting Copper and Zinc from their Ores, of which the following is a specification sufficient to enable others skilled in the art to which the invention appertains to make and use the same.

My invention relates to the extraction of copper and zinc from their ores; and it consists, essentially, in subjecting the reduced or crushed ores of these metals to the action of a solution of what is technically known as "salt-cake," a residuum resulting from the manufacture of muriatic acid, thus utilizing for the purpose what has been practically a waste by-product or one that is comparatively cheap, plentiful, and easily obtainable.

In using the term "salt-cake" I refer to a residual substance composed, substantially, as follows: sulfate of sodium, ninety-five per cent.; chlorid of sodium, two per cent.; sulfuric acid, two per cent.; magnesia, one per cent.; total, one hundred per cent.

The strength of the solution may be varied with relation to the character of the ore to be treated. I have found a saturated solution desirable for general use. Should the ore carry iron, alumina, or other soluble substances in large quantities, a weaker solution may be used to avoid waste by reason of the affinity of the solution for such substances, its affinity for the copper or zinc being greater, so that in the absence of an excess of salt-cake in the solution the latter will take up only copper and zinc. For instance, I have found when using a weak solution of, say, about 5° Baumé scale that the solution exercises a selective action on these metals.

The process consists in immersing the zinc or copper ore, roasted or otherwise, in a powdered state in a bath of water in which more or less of the salt-cake is held in solution and in subjecting the powdered ore to the action of this solution until all the copper or zinc is dissolved out and extracted from the ore. The bath is then filtered to remove the residual ore and the copper or zinc electrically deposited from the solution or otherwise precipitated, as may be preferred.

I am aware that it has been proposed to reduce gold ore by calcination with sodic sulfate or salt-cake, as in patent to C. P. Williams, No. 292,605, of January 29, 1884; also, that it has been proposed to use niter-cake and salt-cake for preparing gold ore for amalgamation and desulfurization, as in patents to C. R. Squire, No. 309,168, of December 9, 1884, and Nos. 312,586 and 312,587, of February 17, 1885; but I am not aware that powdered zinc or copper ores, either roasted or raw, have ever been treated to a solution of salt-cake for the purpose of dissolving out said metals, as above described.

What I claim as my invention, and desire to secure by Letters Patent, is—

1. The herein-described process of treating ores of copper and zinc, and other metals soluble only in a strong solution of the solvent, which consists in exposing the comminuted ore to the action of a solution of sodium sulfate containing hydrochloric and sulfuric acid (salt-cake solution) in proportion to the contained copper and zinc but sufficient in strength to dissolve only copper and zinc therefrom and subsequently recovering these metals from the solution, substantially as described.

2. The herein-described process of treating ores of copper and zinc containing other metals soluble in any excess of solution which may be employed above that required to dissolve the copper and zinc contained therein, which consists in introducing the comminuted ore into a solution of sodium sulfate containing hydrochloric and sulfuric acid (salt-cake solution) not exceeding 5° Baumé, and subsequently recovering these metals from the solution, substantially as set forth.

CALEB G. COLLINS.

Witnesses:
D. W. GARDNER,
GEO. WM. MIATT.